US 12,512,860 B2

(12) United States Patent
Kim

(10) Patent No.: US 12,512,860 B2
(45) Date of Patent: Dec. 30, 2025

(54) ELECTRONIC DEVICE FOR CONTROLLING SWITCH ELECTRICALLY CONNECTED TO ANTENNA AND OPERATION METHOD FOR ELECTRONIC DEVICE

(71) Applicant: Samsung Electronics Co., Ltd., Suwon-si (KR)

(72) Inventor: Kyoungtae Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 135 days.

(21) Appl. No.: 18/627,114

(22) Filed: Apr. 4, 2024

(65) Prior Publication Data

US 2024/0322847 A1    Sep. 26, 2024

Related U.S. Application Data

(63) Continuation of application No. PCT/KR2024/003412, filed on Mar. 19, 2024.

(30) Foreign Application Priority Data

Mar. 24, 2023  (KR) .................. 10-2023-0038487
Apr. 7, 2023   (KR) .................. 10-2023-0046356

(51) Int. Cl.
*H04B 1/00*       (2006.01)
*H01Q 3/24*       (2006.01)
(Continued)

(52) U.S. Cl.
CPC ............ *H04B 1/0064* (2013.01); *H01Q 3/24* (2013.01); *H04B 7/0602* (2013.01); *H04B 7/0805* (2013.01)

(58) Field of Classification Search
CPC ................................ H01Q 3/24; H04B 7/0602
See application file for complete search history.

(56) References Cited

U.S. PATENT DOCUMENTS 9,331,385 B2    5/2016  Kwon et al.
10,341,477 B2   7/2019  Hong et al.
(Continued)

FOREIGN PATENT DOCUMENTS

CN    108011191     5/2018
CN    215070411    12/2021
(Continued)

OTHER PUBLICATIONS

Search Report and Written Opinion dated Jun. 24, 2024 issued in International Patent Application No. PCT/KR2024/003412.

*Primary Examiner* — Graham P Smith
(74) *Attorney, Agent, or Firm* — Nixon & Vanderhye, P.C.

(57) ABSTRACT

In an electronic device and a method of operating an electronic device according to various embodiments, the electronic device may include an antenna. The electronic device may include at least one electronic component. The electronic device may include a switch configured to electrically connect the antenna and at least one of a first path connected to a first ground disposed on one layer of multiple layers of a printed circuit board and a second path connected to a second ground disposed on another layer of the multiple layers. The electronic device may include at least one communication processor, comprising processing circuitry, electrically connected to the switch. At least one communication processor, individually and/or collectively, may output a signal through the antenna in a first state in which the antenna is electrically connected to the first path; control, based on the at least one component being activated, the switch so that the switch is converted from the first state to a second state in which the antenna is electrically connected to the second path; and based on a specified time elapsing, (Continued)

control the switch so that the switch is converted from the second state to the first state.

19 Claims, 9 Drawing Sheets

(51) Int. Cl.
  *H04B 7/06* (2006.01)
  *H04B 7/08* (2006.01)

(56) References Cited

U.S. PATENT DOCUMENTS

| | | | |
|---|---|---|---|
| 11,374,319 | B2 | 6/2022 | Kim et al. |
| 11,817,619 | B2 | 11/2023 | Kim et al. |
| 2020/0396325 | A1 | 12/2020 | Zhong et al. |
| 2022/0181775 | A1 | 6/2022 | Ryu et al. |
| 2022/0201165 | A1 | 6/2022 | Kim |
| 2022/0224003 | A1 | 7/2022 | Kwak et al. |

FOREIGN PATENT DOCUMENTS

| | | |
|---|---|---|
| EP | 3982482 | 4/2022 |
| JP | 2002-101222 | 4/2002 |
| JP | 5442392 B2 | 12/2013 |
| KR | 20110096664 A | 8/2011 |
| KR | 101318877 B1 | 10/2013 |
| KR | 20190019307 A | 2/2019 |
| KR | 10-2020-0140544 | 12/2020 |
| KR | 10-2020-0141337 | 12/2020 |
| KR | 10-2021-0061859 | 5/2021 |
| KR | 10-2021-0102684 | 8/2021 |
| KR | 20210099165 A | 8/2021 |
| KR | 20220089864 A | 6/2022 |
| KR | 20220102383 A | 7/2022 |
| KR | 20220102503 A | 7/2022 |

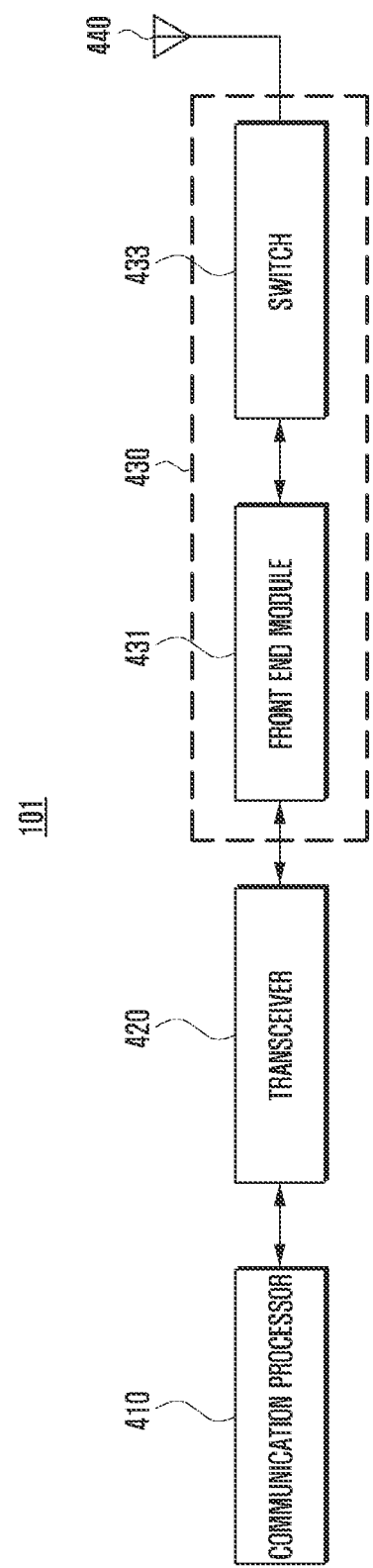

ELECTRONIC DEVICE FOR CONTROLLING SWITCH ELECTRICALLY CONNECTED TO ANTENNA AND OPERATION METHOD FOR ELECTRONIC DEVICE

CROSS-REFERENCE TO RELATED APPLICATIONS

This application is a continuation of International Application No. PCT/KR2024/003412 designating the United States, filed on Mar. 19, 2024, in the Korean Intellectual Property Receiving Office and claiming priority to Korean Patent Application Nos. 10-2023-0038487, filed on Mar. 24, 2023, and 10-2023-0046356, filed on Apr. 7, 2023, in the Korean Intellectual Property Office, the disclosures of each of which are incorporated by reference herein in their entireties.

BACKGROUND

Field

The disclosure relates to an electronic device and an operation method for an electronic device and to a technology for controlling a switch electrically connected to an antenna.

Description of Related Art

In order to meet the increase in the demand for wireless data traffic after the commercialization of 4G communication systems, considerable effort has been made to develop pre-5G communication systems or improved 5G communication systems. For this reason, "5G communication systems" or "pre-5G communication systems" are called "beyond 4G network communication systems" or "beyond LTE systems (post-LTE systems)". In order to achieve a high data transmission rate, 5G communication systems are being developed to be implemented in an ultra-high frequency (mm Wave) band (for example, a band of 6 GHz or higher) in addition to a band (a band of 6 GHz or lower) used in LTE systems. In 5G communication systems, technologies such as beamforming, massive MIMO, full dimensional MIMO (FD-MIMO), array antennas, analog beam-forming, and large-scale antennas have been discussed.

Recent electronic devices may arrange more antennas therein to achieve higher transmission or reception rates. As the number of antennas arranged in an electronic device increases, distances between components and antennas present in the electronic device may be reduced.

The above-described information may be provided as a related art to help understanding of the disclosure. No claim or determination is made as to the applicability of any of the foregoing as prior art to the disclosure.

As distances between components and antennas present in an electronic device are reduced, at least one component present in the electronic device may be more affected by a signal radiated by an antenna.

For example, when the antenna radiates a signal, a portion of the signal may be radiated into the interior of the electronic device. In case that a portion of the signal is radiated into the interior of the electronic device, the portion of the signal may affect an operation of at least one component adjacent to the antenna.

For example, when the antenna radiates the signal, a camera adjacent to the antenna may be caused to show a malfunction (e.g., an operation in which the camera reboots unintentionally, or the camera fails to capture some frames).

The technical problems addressed by the disclosure are not limited to the above technical problems and those skilled in the art to which the disclosure pertains will more clearly understand other technical problems not described herein from the following description.

SUMMARY

An electronic device according to an example embodiment may include an antenna. The electronic device may include at least one electronic component. The electronic device may include a switch configured to electrically connect the antenna and at least one of a first path connected to a first ground disposed on one layer of multiple layers of a printed circuit board and a second path connected to a second ground disposed on another layer of the multiple layers. The electronic device may include at least one communication processor, comprising processing circuitry, electrically connected to the switch. At least one communication processor, individually and/or collectively, may be configured to: output a signal through the antenna in a first state in which the antenna is electrically connected to the first path; based on the at least one component being activated, control the switch so that the switch is converted from the first state to a second state in which the antenna is electrically connected to the second path; and based on a specified time elapsing, control the switch so that the switch is converted from the second state to the first state.

A method of operating an electronic device according to an example embodiment may include: outputting a signal through an antenna in a first state in which the antenna is electrically connected to a first path connected to a first ground disposed on one layer of multiple layers of a printed circuit board; controlling a switch based on at least one electronic component being activated so that the switch is converted from the first state to a second state in which the antenna and a second path connected to a second ground disposed on another layer of the multiple layers are connected; and controlling the switch based on a specified time elapsing so that the switch is converted from the second state to the first state.

A communication circuit according to an example embodiment may include: a switch configured to electrically connect an antenna and at least one of a first path connected to a first ground disposed on one layer of multiple layers of a printed circuit board and a second path connected to a second ground disposed on another layer of the multiple layers; wherein the switch may be converted from a first state in which an antenna is electrically connected to the first path to a second state in which the antenna is electrically connected to the second path based on at least one electronic component of the electronic device being activated; and the switch may be configured to be converted from the second state to the first state based on a specified time elapsing.

The electronic device and the operation method for an electronic device according to an embodiment may control a switch so that a ground electrically connected to an antenna is changed for a specified time based on at least one component adjacent to the antenna being activated. Therefore, the electronic device may reduce or prevent a malfunction of at least one component adjacent to the antenna by reducing a current density generated by a signal radiated through the antenna.

The electronic device and the operation method for an electronic device according to an embodiment may not perform an operation of reducing an intensity of a signal radiated for reducing a malfunction of at least one component adjacent to the antenna by reducing a current density generated by a signal radiated through the antenna. Therefore, the electronic device may prevent and/or reduce deterioration of communication quality due to an operation of reducing an intensity of a radiated signal.

It will be appreciated by one skilled in the art to which the disclosure pertains that effects which may be achieved from the disclosure are not limited to the effects described above and other effects that are not described above will be clearly understood from the following detailed description.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 4 is a block diagram illustrating an example configuration of an electronic device according to an embodiment.

DETAILED DESCRIPTION

Figure 1:
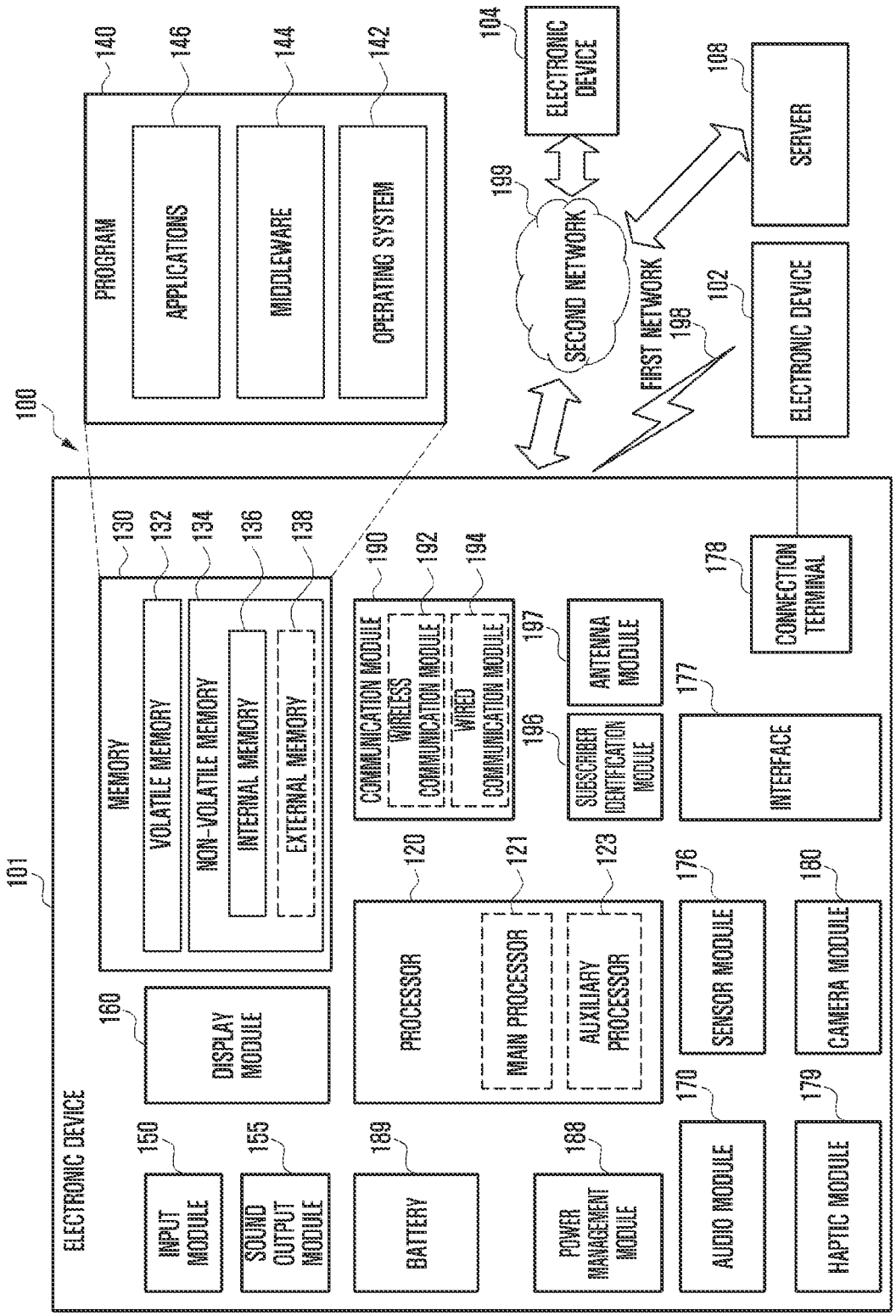
FIG. 1 is a block diagram illustrating an example electronic device in a network environment according to an embodiment.

Hereinafter, various example embodiments of the disclosure will be described in greater detail with reference to accompanying drawings. However, the disclosure may be realized in many different forms and should not be construed as being limited to the various example embodiments disclosed herein. In connection with a description of the drawings, like or similar reference numerals may be used for like or similar elements. Furthermore, in the drawings and descriptions related thereto, descriptions of well-known functions and configurations may be omitted for clarity and brevity.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions. The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (cMBB), massive machine type communications (mMTC), or ultra-reliable and low-latency communications (URLLC). The wireless communication module 192 may support a high-frequency band (e.g., the mm Wave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
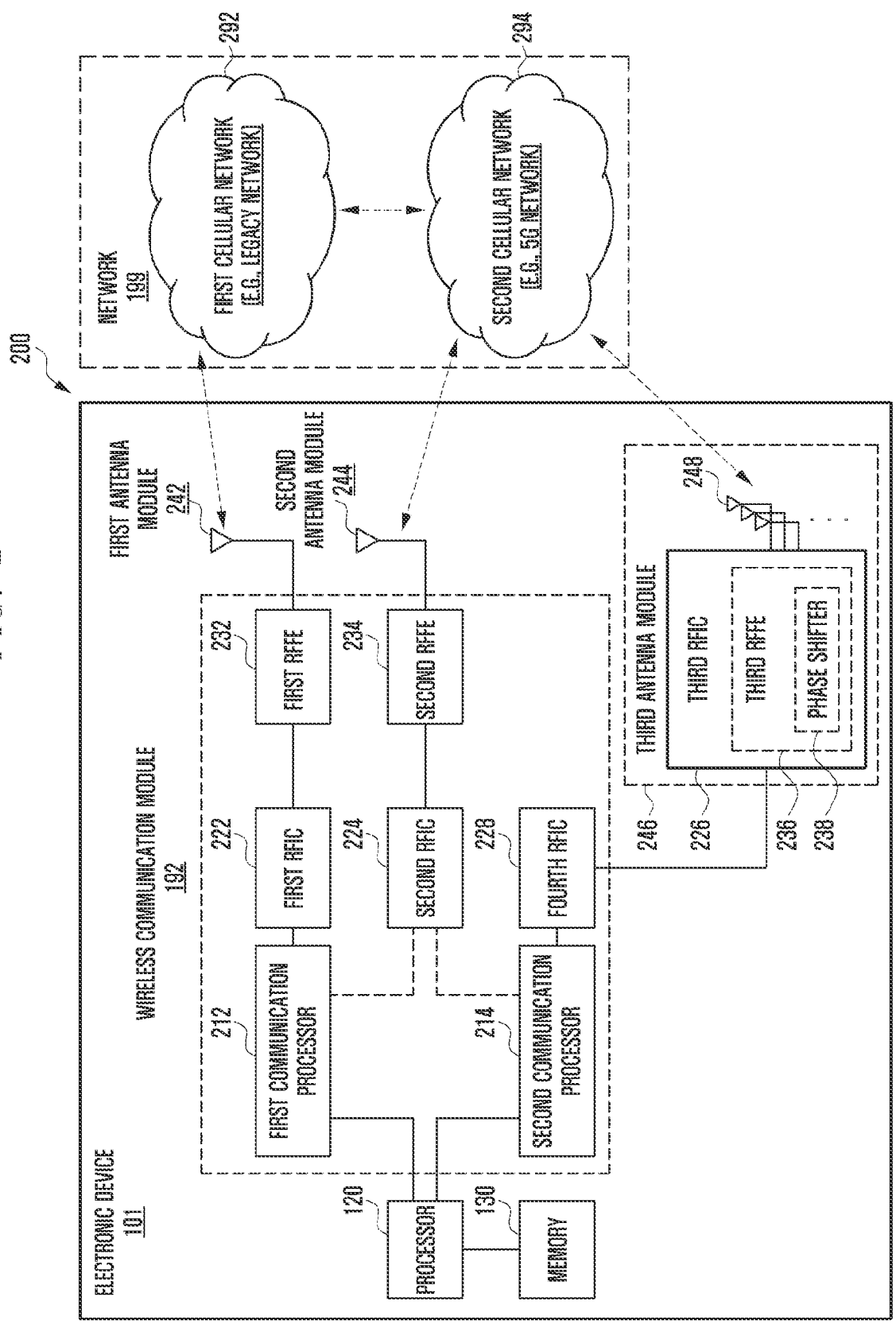
FIG. 2 is a block diagram illustrating an example configuration of an electronic device for supporting legacy network communication and 5G network communication according to an embodiment.

FIG. 2 is a block diagram 200 illustrating an example configuration of an electronic device 101 for supporting legacy network communication and 5G network communication according to various embodiments. Referring to FIG. 2, the electronic device 101 may include a first communication processor (e.g., including processing circuitry) 212, a second communication processor (e.g., including processing circuitry) 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, and an antenna 248. The electronic device 101 may further include the processor (e.g., including processing circuitry) 120 and the memory 130. The network 199 may include a first network 292 and a second network 294. According to an embodiment of the disclosure, the electronic device 101 may further include at least one component among the components illustrated in FIG. 1, and the network 199 may further include at least one other network. According to an embodiment of the disclosure, the first communication processor 212, the second communication processor 214, the first RFIC 222, the second RFIC 224, the fourth RFIC 228, the first RFFE 232, and the second RFFE 234 may be included as at least a part of the wireless communication module 192. According to an embodiment of the disclosure, the fourth RFIC 228 may be omitted or may be included as a part of the third RFIC 226.

The first communication processor 212 may include various processing circuitry and/or multiple processors. For example, as used herein, including the claims, the term "processor", "communication processor", or the like, may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions. The first communication processor 212 may establish a communication channel of a band to be used for wireless communication with the first network 292, and may support legacy network communication via the established communication channel. According to certain embodiments of the disclosure, the first network may be a legacy network including 2G, 3G, 4G, or long term evolution (LTE) network. The second communication processor 214 may include various processing circuitry and/or multiple processors. For example, as used herein, including the claims, the term "processor", "communication processor", or the like, may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions. The second communication processor 214 may establish a communication channel corresponding to a designated band (e.g., approximately 6 GHz to 60 GHZ) among bands to be used for wireless communication with the second network 294, and may support 5G network communication via the established channel. According to certain embodiments of the disclosure, the second network 294 may be a 5G network defined in 3GPP. Additionally, according to an embodiment of the disclosure, the first communication processor 212 or the second communication processor 214 may establish a communication channel corresponding to another designated band (e.g., lower than 6 GHZ) among bands to be used for wireless communication with the second network 294, and may support 5G network communication via the established channel. According to an embodiment of the disclosure, the first communication processor 212 and the second communication processor 214 may be implemented in a single chip or a single package. According to certain embodiments of the disclosure, the first communication processor 212 or the second communication processor 214 may be implemented in a single chip or a single package, together with the processor 120, the auxiliary processor 123, or the communication module 190.

In the case of transmission, the first RFIC 222 may convert a baseband signal generated by the first communication processor 212 into a radio frequency (RF) signal in a range of approximately 700 MHz to 3 GHz used for the first network 292 (e.g., a legacy network). In the case of reception, an RF signal is obtained from the first network 292 (e.g., a legacy network) via an antenna (e.g., the first antenna module 242), and may be preprocessed via an RFFE (e.g., the first RFFE 232). The first RFIC 222 may convert the preprocessed RF signal to a baseband signal so that the base band signal is processed by the first communication processor 212.

In the case of transmission, the second RFIC 224 may convert a baseband signal generated by the first communication processor 212 or the second communication processor 214 into an RF signal (hereinafter, a 5G Sub6 RF signal) of a Sub6 band (e.g., lower than 6 GHz) used for the second network 294 (e.g., 5G network). In the case of reception, a 5G Sub6 RF signal is obtained from the second network 294 (e.g., a 5G network) via an antenna (e.g., the second antenna module 244), and may preprocessed by an RFFE (e.g., the second RFFE 234). The second RFIC 224 may convert the preprocessed 5G Sub6 RF signal into a baseband signal so that the baseband signal is processed by a corresponding communication processor from among the first communication processor 212 or the second communication processor 214.

The third RFIC 226 may convert a baseband signal generated by the second communication processor 214 into an RF signal (hereinafter, a 5G Above6 RF signal) of a 5G Above6 band (e.g., approximately 6 GHz to 60 GHZ) to be used for the second network 294 (e.g., 5G network). In the case of reception, a 5G Above6 RF signal is obtained from the second network 294 (e.g., a 5G network) via an antenna (e.g., the antenna 248), and may be preprocessed by the third RFFE 236. The third RFIC 226 may convert the preprocessed 5G Above6 RF signal to a baseband signal so that the base band signal is processed by the second communication processor 214. According to an embodiment of the disclosure, the third RFFE 236 may be implemented as a part of the third RFIC 226.

According to an embodiment of the disclosure, the electronic device 101 may include the fourth RFIC 228, separately from or as a part of the third RFIC 226. In this instance, the fourth RFIC 228 may convert a baseband signal generated by the second communication processor 214 into an RF signal (hereinafter, an IF signal) in an intermediate frequency band (e.g., approximately 9 GHz to 11 GHZ), and may transfer the IF signal to the third RFIC 226. The third RFIC 226 may convert the IF signal to a 5G Above6 RF signal. In the case of reception, a 5G Above6 RF signal is received from the second network 294 (e.g., a 5G network) via an antenna (e.g., the antenna 248), and may be converted into an IF signal by the third RFFE 226. The fourth RFIC 228 may convert the IF signal to a baseband signal so that the base band signal is processed by the second communication processor 214.

According to an embodiment of the disclosure, the first RFIC 222 and the second RFIC 224 may be implemented as a single chip or at least a part of the single package. According to an embodiment of the disclosure, the first RFFE 232 and the second RFFE 234 may be implemented as a single chip or at least a part of the single package. According to an embodiment of the disclosure, at least one antenna module of the first antenna module 242 or the second antenna module 244 may be omitted, or may be combined with another antenna module so as to process RF signals in a plurality of bands.

According to an embodiment of the disclosure, the third RFIC 226 and the antenna 248 may be disposed in the same substrate, and may form the third antenna module 246. For example, the wireless communication module 192 or the processor 120 may be disposed in a first substrate (e.g., main PCB). In this instance, the third RFIC 226 is disposed in a part (e.g., a lower part) of the second substrate (e.g., a sub PCB) separate from the first substrate and the antenna 248 is disposed on another part (e.g., an upper part), so that the third antenna module 246 is formed. By disposing the third RFIC 226 and the antenna 248 in the same substrate, the length of a transmission line therebetween may be reduced. For example, this may reduce a loss (e.g., attenuation) of a signal in a high-frequency band (e.g., approximate 6 GHz to 60 GHZ) used for 5G network communication, the loss being caused by a transmission line. Accordingly, the electronic device 101 may improve the quality or speed of communication with the second network 294 (e.g., 5G network).

According to an embodiment of the disclosure, the antenna 248 may be implemented as an antenna array including a plurality of antenna elements which may be used for beamforming. In this instance, the third RFIC 226 may be, for example, a part of the third RFFE 236, and may include a plurality of phase shifters 238 corresponding to a plurality of antenna elements. In the case of transmission, each of the plurality of phase shifters 238 may shift the phase of a 5G Above6RF signal to be transmitted to the outside of the electronic device 101 (e.g., a base station of a 5G network) via a corresponding antenna element. In the case of reception, each of the plurality of phase shifters 238 may shift the phase of the 5G Above6 RF signal received from the outside via a corresponding antenna element into the same or substantially the same phase. This may enable transmission or reception via beamforming between the electronic device 101 and the outside.

The second network 294 (e.g., 5G network) may operate independently (e.g., Stand-Along (SA)) from the first network 292 (e.g., a legacy network), or may operate by being connected thereto (e.g., Non-Stand Alone (NSA)). For example, in the 5G network, only an access network (e.g., 5G radio access network (RAN) or next generation RAN (NG RAN)) may exist, and a core network (e.g., next generation core (NGC)) may not exist. In this instance, the electronic device 101 may access an access network of the 5G network, and may access an external network (e.g., the Internet) under the control of the core network (e.g., an evolved packed core (EPC)) of the legacy network. Protocol information (e.g., LTE protocol information) for communication with the legacy network or protocol information (e.g., New Radio (NR) protocol information) for communication with the 5G network may be stored in the memory 230, and may be accessed by another component (e.g., the processor 120, the first communication processor 212, or the second communication processor 214).

Figure 3A:
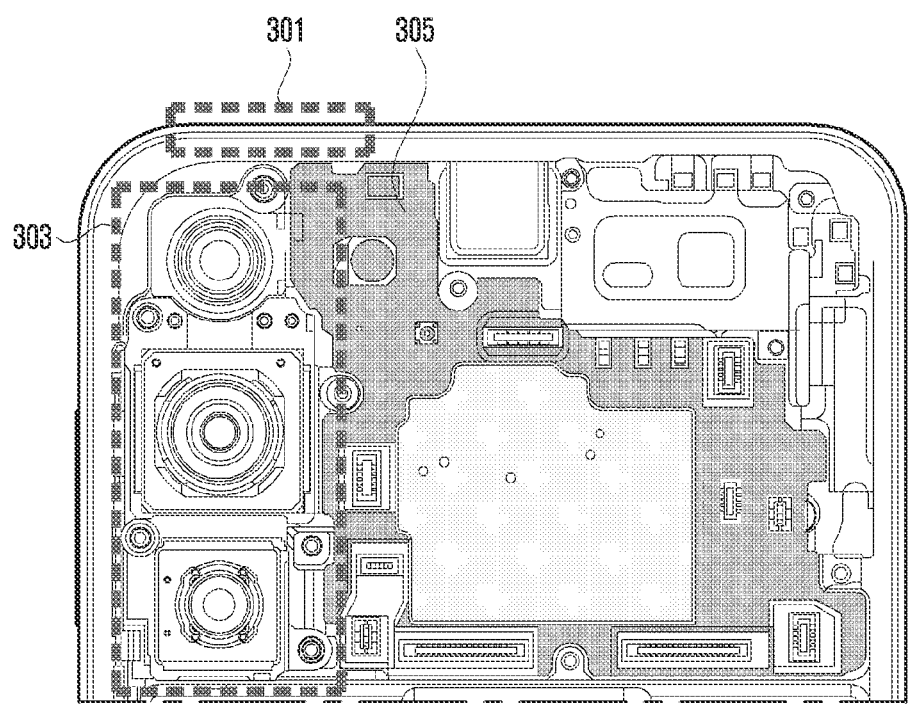
FIG. 3A is a diagram illustrating an antenna and at least one component in an electronic device according to an embodiment.

FIG. 3A is a diagram illustrating an antenna and at least one electronic component in an electronic device according to various embodiments.

Referring to FIG. 3A, the electronic device (e.g., the electronic device 101 in FIG. 1) may include an antenna (e.g., the first antenna module 242 in FIG. 2) 301 and a camera (e.g., the camera module 180 in FIG. 1) 303.

The antenna 301 may be electrically connected to a wireless communication module (e.g., the wireless communication module 192 in FIG. 2) disposed on a partial area of a printed circuit board 305. The antenna 301 may be electrically connected to a ground realized on the printed circuit board 305.

The antenna 301 may radiate a signal of a specific frequency band transmitted by the wireless communication module 192. When the antenna 301 radiates a signal, a portion of the signal may be radiated into the interior of the electronic device 101. In case that a portion of the signal is radiated into the interior of the electronic device 101, the portion of the signal may affect an operation of at least one component (e.g., the camera 303) adjacent to the antenna 301.

According to an embodiment, when the antenna 301 radiates the signal, the camera 303 may be caused to show a malfunction (e.g., an operation in which the camera 303 reboots unintentionally, or the camera 303 fails to capture some frames).

Figure 3B:
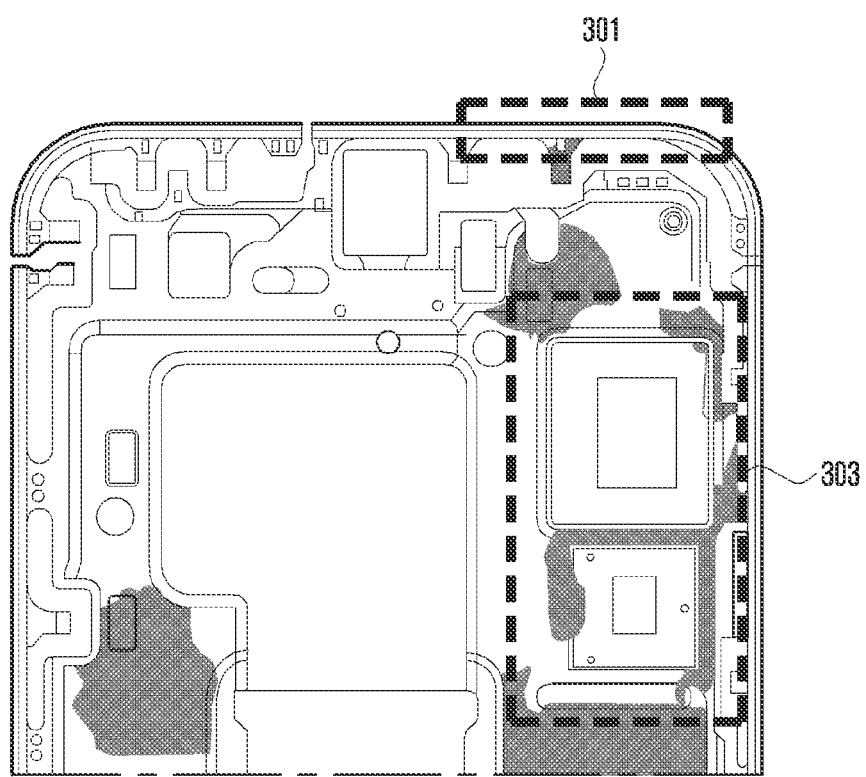
FIG. 3B is a diagram illustrating example current density according to radiation of a signal through an antenna in an electronic device according to an embodiment.

FIG. 3B is a diagram illustrating example current density according to radiation of a signal through an antenna in an electronic device according to various embodiments.

FIG. 3B illustrates a density of a current flowing inside the electronic device (e.g., the electronic device 101 in FIG. 1) in case that the electronic device 101 radiates a signal through the antenna 301 (e.g., the antenna 301 in FIG. 3A).

In FIG. 3B, the greater the density of a current, the darker the color, and the lower the density, the lighter the color in a relative sense.

Referring to FIG. 3B, it may be confirmed that a relatively larger current flows around a component (e.g., the camera 303) adjacent to the antenna 301 as the antenna 301 radiates a signal. The camera 303 which is the component adjacent to the antenna 301 may malfunction as a large current flows around the camera.

According to an embodiment, when the antenna 301 radiates the signal, the camera 303 may be caused to show a malfunction (e.g., an operation in which the camera 303 reboots unintentionally, or the camera 303 fails to capture some frames).

To reduce (or prevent) the malfunction of the camera 303, the electronic device 101 may reduce (e.g., Tx power backoff) an intensity of the signal radiated by the antenna 301. However, the reduction of the intensity of the signal radiated by the antenna 301 may cause reduction in communication performance of the electronic device 101.

According to an embodiment, the electronic device 101 may transmit a sounding reference signal (SRS) to a cellular network (e.g., the second network 294 in FIG. 2) through the antenna 301. However, the reduction of the intensity of the signal radiated by the antenna 301 may cause the cellular network 294 not to receive the SRS signal at an appropriate time, the cellular network 294 may not appropriately perform resource allocation which may be used by the electronic device 101, and communication performance of the electronic device 101 may be deteriorated.

According to an embodiment, in case that the electronic device 101 reduces the intensity of the signal radiated by the antenna 301 while performing a service (e.g., a video call and a live streaming service) for transmitting an image captured by the camera 303 in real time, the transmission speed of the image captured by the camera 303 may decrease or the transmission success rate may decrease.

Hereinafter, a description will be given of an embodiment which may reduce (or prevent) a malfunction of a specific component adjacent to the antenna 301 as the antenna 301 radiates a signal.

FIG. 4 is a block diagram illustrating an example configuration of an electronic device according to an embodiment.

Referring to FIG. 4, the electronic device (e.g., the electronic device 101 in FIG. 1) may include a communication processor (e.g., the first communication processor 212 in FIG. 2 or the second communication processor 214 in FIG. 2) (e.g., including processing circuitry) 410, a transceiver (e.g., the first RFIC 222, the second RFIC 224, or the fourth RFIC 228 in FIG. 2) (e.g., including circuitry) 420, a communication circuit 430, and/or an antenna (e.g., the first antenna module 242, the second antenna module 244, or the third antenna module 246 in FIG. 2) 440.

The communication processor 410 may include various processing circuitry and/or multiple processors. For example, as used herein, including the claims, the term "processor", "communication processor", or the like, may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions. The communication processor 410 may receive and/or transmit control data or user data through near-field wireless communication (e.g., Wi-Fi or Bluetooth) or cellular wireless communication (e.g., the 4th generation mobile communication or the 5th generation mobile communication). The communication processor 410 may establish cellular communication connection with a base station through the control data, transmit, to the base station, data received from an application processor (e.g., the processor 120 in FIG. 1) through the established cellular communication, or transmit data received from the base station to the application processor 120.

The transceiver 420 may include various circuitry and perform various operations of processing a signal received from the communication processor 410. For example, the transceiver 420 may perform a modulation operation with respect to a signal received from the communication processor 410. For example, the transceiver 420 may perform a frequency modulation operation for converting a baseband signal into a radio frequency (RF) signal used for cellular communication. The transceiver 420 may perform a demodulation operation with respect to a signal received from the outside through the communication circuit 430. For example, the transceiver 420 may perform a frequency demodulation operation by converting a radio frequency (RF) signal into a baseband signal.

The communication circuit 430 may receive a signal radiated from the outside through the antenna 440, or include one or more RF chains for radiating, through the antenna 440, a signal transmitted by the transceiver 420. For example, the RF chain may refer to a path through which a signal moves between the transceiver 420 and the antenna 440. The RF chain may amplify a signal received through the antenna 440 and/or a signal transmitted by the transceiver 420 and include a front end module 431 including various components (e.g., an amplifier, a switch, and a filter) for performing an operation of filtering the amplified signal.

The communication circuit 430 may include a switch 433 for electrically connecting the antenna 440 and one of multiple grounds inside the electronic device 101.

According to an embodiment, the switch 433 may electrically connect the antenna 440 to one of a first path (e.g., a first path 503 in FIG. 5) connected to a first ground (e.g., a first ground 501 in FIG. 5) disposed on one of multiple layers of a printed circuit board (e.g., the printed circuit board 305 in FIG. 3A) and a second path (e.g., a second path 507 in FIG. 5) connected to a second ground (e.g., a second ground 505 in FIG. 5) disposed on another one of the multiple layers of the printed circuit board 305.

The communication processor 410 may control the switch 433 through various methods. In case that there exists a path (e.g., an inter-process communication (IPC) path) for transmitting a control signal for the switch 433 between the communication processor 410 and the switch 433, the communication processor 410 may control the switch 433 using a method of transmitting the control signal for the switch 433 to the switch 433. In case that there is no path (e.g., an IPC path) for transmitting a control signal for the switch 433 between the communication processor 410 and the switch 433, the communication processor 410 may control the switch 433 by transmitting the control signal for the switch 433 to the switch 433 through the transceiver 420 or the front end module 431.

In a first state in which the antenna 440 is electrically connected to the first path 503, the communication processor 410 may output (or radiate) a signal through the antenna 440. The signal output (or radiated) through the antenna 440 may be transmitted to a cellular network (e.g., the first cellular network 292 in FIG. 2 or the second cellular network 294 in FIG. 2) and may be used for performing various services.

In case that at least one component of the electronic device 101 is activated, the communication processor 410 may perform a series of operations for reducing (or preventing) a malfunction of the at least one component.

The at least one component may correspond to a component adjacent to the antenna 440. According to an embodiment, the at least one component may include a camera (e.g., the camera 303 in FIG. 3A) adjacent to the antenna 440. According to an embodiment, the at least one component may include another antenna adjacent to the antenna 440. According to an embodiment, the at least one component may include a sensor (e.g., a proximity sensor) adjacent to the antenna 440.

The series of operations of reducing (or preventing) a malfunction of the at least one component may include an operation of reducing a density of a current existing around the at least one component.

In case that at least one component of the electronic device 101 is activated, the communication processor 410 may receive, from an application processor (e.g., the processor 120 in FIG. 1), information indicating that the at least one component is activated, so as to detect that the at least one component of the electronic device 101 is activated. In case that at least one component is activated, the communication processor 410 may receive, from at least one component, information indicating that the at least one component is activated, so as to detect that the at least one component of the electronic device 101 is activated.

When at least one component of the electronic device 101 is activated, the communication processor 410 may control the switch 433 to change a state of the switch 433.

When at least one component of the electronic device 101 is not activated, the communication processor 410 may maintain a state of the switch 433 without change. In case that at least one component of the electronic device 101 is not activated and the switch 433 is in a first state, the communication processor 410 may maintain the state of the switch 433 in the first state. In case that at least one component of the electronic device 101 is not activated and the switch 433 is in a second state, the communication processor 410 may maintain the state of the switch 433 in the second state.

According to an embodiment, when at least one component of the electronic device 101 is activated, the communication processor 410 may control the switch 433 so that the switch 433 is converted from the first state to the second state (or converted from the second state to the first state). The first state may include a state in which the antenna 440 is electrically connected to the first path 503, and the second state may include a state in which the antenna 440 is electrically connected to the second path 507. The communication processor 410 may control the switch 433 to change the state of the switch 433 at predetermined times (e.g., in a range of about 100 ms). According to an embodiment, when a designated time has been elapsed after the switch 433 is converted from the first state to the second state, the communication processor 410 may control the switch 433 so that the switch 433 is converted from the second state to the first state. The above-described operation may be repeatedly performed until the at last one component of the electronic device 101 is deactivated.

The conversion of the switch 433 from the first state to the second state may refer to a change of a ground electrically connected to the antenna 440 from the first ground 501 to the second ground 505. As the ground electrically connected to the antenna 440 is changed at predetermined times, a current generated by a portion of a signal radiated by the antenna 440 may be dispersed.

The first ground 501 may be electrically spaced apart from the second ground 505, and one layer of the printed circuit board 305 on which the first ground 501 is disposed may be different from one layer of the printed circuit board 305 on which the second ground 505 is disposed. In order to increase a degree of dispersion of the current generated by a portion of the signal radiated by the antenna 440, one layer of the printed circuit board 305 on which the first ground 501 is disposed may be the layer furthest from another layer of the printed circuit board 305 on which the second ground 505 is disposed. According to an embodiment, assuming that the printed circuit board 305 is realized to have 10 layers and the first ground 501 is realized on a first layer of the 10 layers, the second ground 503 may be realized on a tenth layer corresponding to the farthest from the first layer among the 10 layers. The second ground 505 may correspond to a ground not electrically connected to another antenna so as to reduce (or prevent) interference between antennas.

According to an embodiment, the density of the current existing around the at least one component of the electronic device 101 when the ground electrically connected to the antenna 440 is changed at predetermined times may be lower compared to that of the current existing around the at least one component of the electronic device 101 when the ground electrically connected to the antenna 440 is not changed.

The decrease in density of the current existing around the at least one component of the electronic device 101 may reduce (or prevent) a malfunction of the at least one component of the electronic device 101.

As described above, the electronic device 101 may reduce (or prevent) a malfunction of at least one component by changing the ground electrically connected to the antenna 440 at predetermined times when the at least one component disposed around the antenna 440 is activated.

Figure 5:
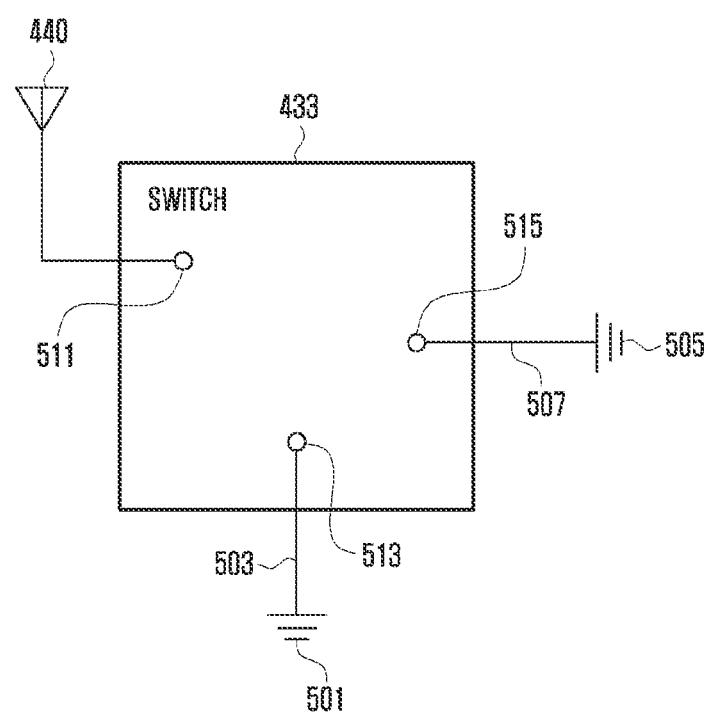
FIG. 5 is a diagram illustrating an example operation of a switch according to activation of at least one component in an electronic device according to an embodiment.

FIG. 5 is a diagram illustrating an example operation of a switch according to activation of at least one component in an electronic device according to various embodiments.

Referring to FIG. 5, the switch 433 may electrically connect the antenna 440 and one of multiple grounds including the first ground 501 and the second ground 505.

According to an embodiment, the switch 433 may electrically connect the antenna 440 to one of the first path 503 connected to the first ground 501 disposed on one of multiple layers of the printed circuit board (e.g., the printed circuit board 305 in FIG. 3A) and the second path 507 connected to the second ground 505 disposed on another one of the multiple layers of the printed circuit board 305.

Although not shown in FIG. 5, the first path 503 and/or the second path 507 may be electrically connected to other components (e.g., a passive element and an active element).

According to a control signal transmitted by other components (e.g., the transceiver 420 in FIG. 4) electrically connected to the communication processor (e.g., the communication processor 410 in FIG. 4) or the switch 433, the switch 433 may change a ground electrically connected to the antenna 440.

According to an embodiment, the switch 433 may receive a control signal of the communication processor 410 according to activation of at least one component adjacent to the antenna 440 and may change a ground electrically connected to the antenna 440 from the first ground 501 to the second ground 505 (or change from the second ground 505 to the first ground 501).

In order to change a ground electrically connected to the antenna 440 from the first ground 501 to the second ground 505, the switch 433 may release connection between a first port 511 electrically connected to the antenna 440 and a second port 513 electrically connected to the first path 503 and establish connection between the first port 511 and a third port 515 electrically connected to the second path 507.

After a predetermined time has elapsed, the switch 433 may receive a control signal of the communication processor 410 and change a ground electrically connected to the antenna 440 from the second ground 505 to the first ground 501. In order to change a ground electrically connected to the antenna 440 from the second ground 505 to the first ground 501, the switch 433 may release connection between the first port 511 and the third port 515 and establish connection between the first port 511 and the second port 513.

The switch 433 may change the ground electrically connected to the antenna 440 at predetermined times (e.g., in a range of about 100 ms) until the at least one component adjacent to the antenna 440 is deactivated.

Figure 6A:
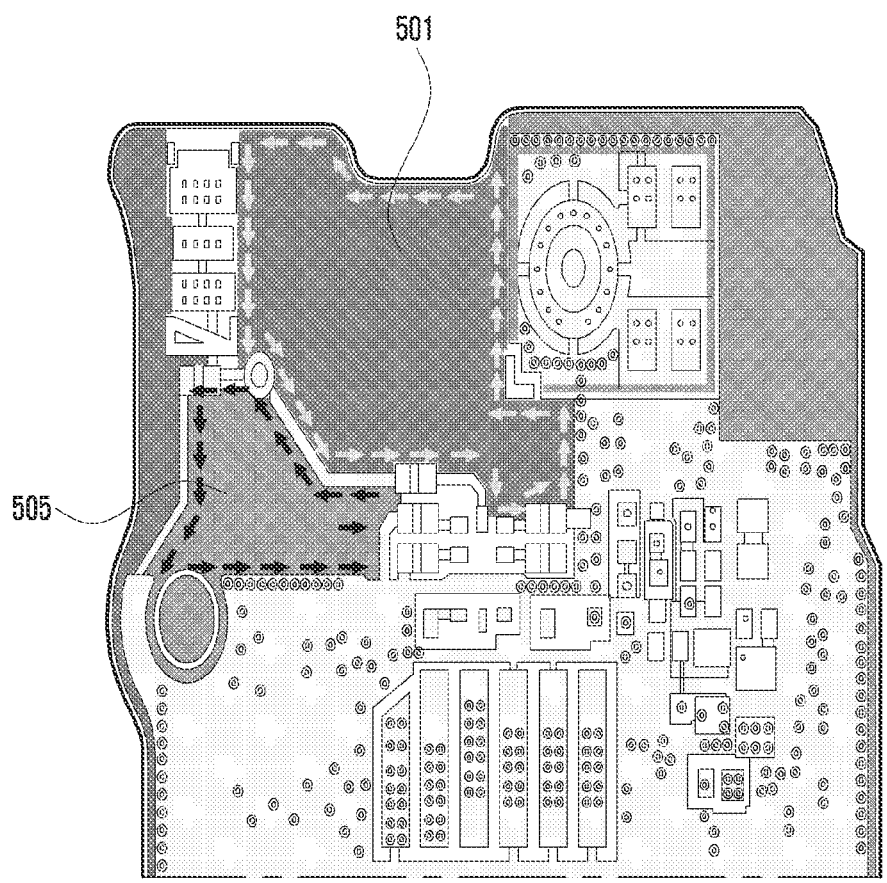
FIG. 6A is a diagram illustrating a first ground and a second ground in an electronic device according to an embodiment.

FIG. 6A is a diagram illustrating examples of a first ground and a second ground in an electronic device according to various embodiments.

FIG. 6A illustrates the first ground 501 (e.g., the first ground 501 in FIG. 5) and the second ground 505 (e.g., the second ground 505 in FIG. 5).

The first ground 501 may be electrically spaced apart from the second ground 505.

A layer on which the first ground 501 is disposed and a layer on which the second ground 505 is disposed may be different so that the first ground 501 may be electrically spaced apart from the second ground 505.

In order to increase a degree of dispersion of the current generated by a portion of the signal radiated by the antenna (e.g., the antenna 440 in FIG. 4 or FIG. 5), one layer of the printed circuit board 305 on which the first ground 501 is disposed may be the layer furthest from another layer of the printed circuit board 305 on which the second ground 503 is disposed. According to an embodiment, assuming that the printed circuit board 305 is realized to have 10 layers and the first ground 501 is realized on a first layer of the 10 layers, the second ground 503 may be realized on a tenth layer corresponding to the farthest from the first layer among the 10 layers. The second ground 503 may correspond to a ground not electrically connected to another antenna so as to reduce (or prevent) interference between antennas.

Figure 6B:
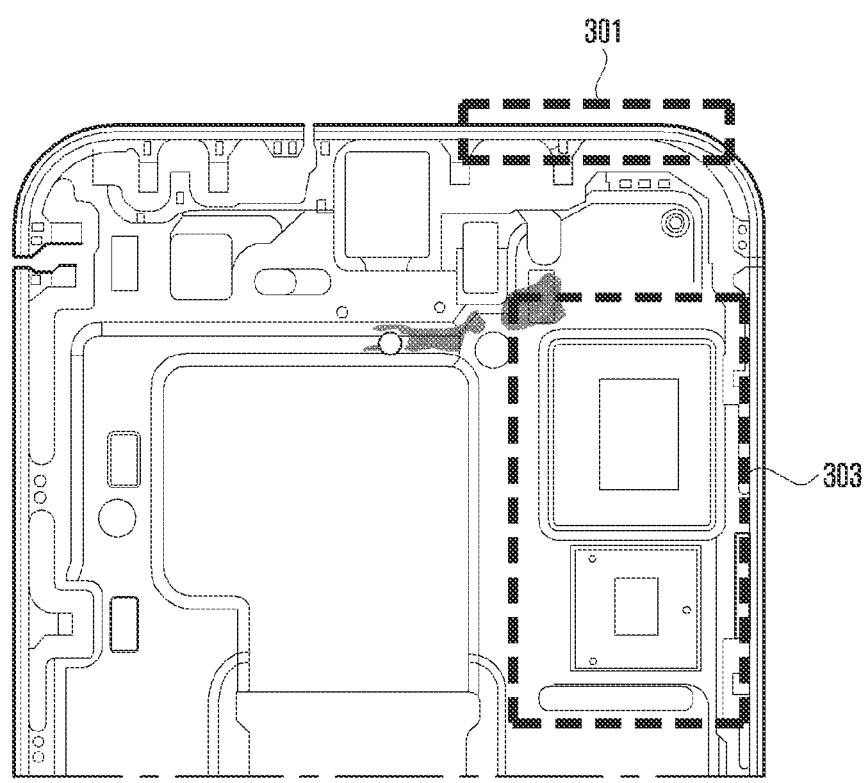
FIG. 6B is a diagram illustrating example current density according to radiation of a signal through an antenna in an electronic device according to an embodiment.

FIG. 6B is a diagram illustrating example current density according to radiation of a signal through an antenna in an electronic device according to various embodiments.

FIG. 6B illustrates a density of a current flowing inside the electronic device (e.g., the electronic device 101 in FIG. 4) in case that the electronic device 101 radiates a signal through the antenna (e.g., the antenna 440 in FIG. 4 or FIG. 5).

In FIG. 6B, the greater the density of a current, the darker the color, and the lower the density, the lighter the color in a relative sense.

In a first state in which the antenna 440 is electrically connected to the first path (e.g., the first path 503 in FIG. 5), the electronic device 101 may output (or radiate) a signal through the antenna 440. In case that at least one component of the electronic device 101 is activated, the electronic device 101 may perform a series of operations for reducing (or preventing) a malfunction of the at least one component.

When at least one component of the electronic device 101 is activated, the electronic device 101 may control the switch (e.g., the switch 433 in FIG. 4) to change a state of the switch 433.

According to an embodiment, when at least one component of the electronic device 101 is activated, the electronic device 101 may control the switch 433 so that the switch 433 is converted from the first state to the second state (or converted from the second state to the first state). The first state may include a state in which the antenna 440 is electrically connected to the first path 503, and the second state may include a state in which the antenna 440 is electrically connected to the second path (e.g., the second path 507 in FIG. 5). The communication processor (e.g., the communication processor 410 in FIG. 4) may control the switch 433 to change the state of the switch 433 at predetermined times (e.g., about 100 ms). According to an embodiment, when a designated time has been elapsed after the switch 433 is converted from the first state to the second state, the electronic device 101 may control the switch 433 so that the switch 433 is converted from the second state to the first state. The above-described operation may be repeatedly performed until the at last one component of the electronic device 101 is deactivated.

The conversion of the switch 433 from the first state to the second state may refer to a change of a ground electrically connected to the antenna 440 from the first ground 501 to the second ground 505. As the ground electrically connected to the antenna 440 is changed at predetermined times, a current generated by a portion of a signal radiated by the antenna 440 may be dispersed.

When comparing FIG. 3B illustrating the current density in case that the ground electrically connected to the antenna 440 is not changed with FIG. 6B illustrating the current density in case that the ground electrically connected to the antenna 440 is changed at predetermined times, it may be confirmed that the current density in case that the ground electrically connected to the antenna 440 is changed at predetermined times is lower than the current density in case that the ground electrically connected to the antenna 440 is not changed.

The decrease in density of the current existing around the at least one component of the electronic device 101 may reduce (or prevent) a malfunction of the at least one component of the electronic device 101.

As described above, the electronic device 101 may reduce (or prevent) a malfunction of at least one component by changing the ground electrically connected to the antenna 440 at predetermined times when the at least one component disposed around the antenna 440 is activated.

Figure 7:
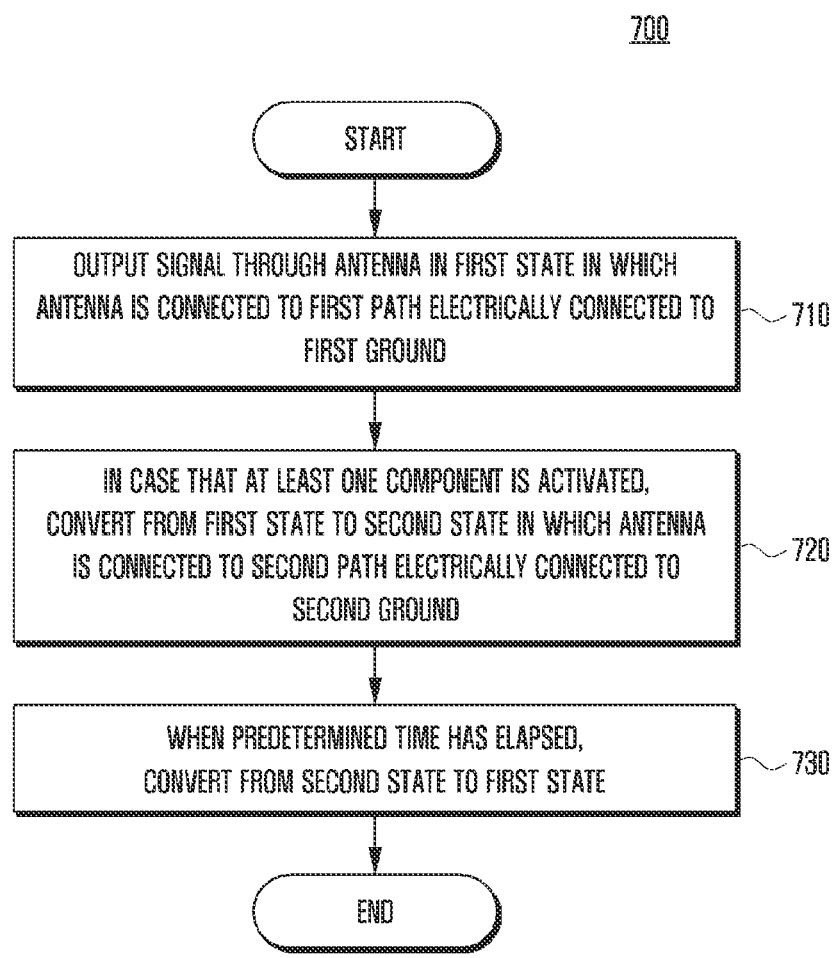
FIG. 7 is a flowchart illustrating an example method of operating an electronic device according to an embodiment.

FIG. 7 is a flowchart 700 illustrating an example method of operating an electronic device according to various embodiments.

In the following example, respective operations may be sequentially performed, but are not necessarily sequentially performed. For example, the sequential position of each operation may be changed, or at least two operations may be performed in parallel.

According to an embodiment, it may be understood that operation 710 to operation 730 are performed by a communication processor (e.g., the communication processor 410 in FIG. 4) of an electronic device (e.g., the electronic device 101 in FIG. 4).

In operation 710, the electronic device (e.g., the electronic device 101 in FIG. 4) may output a signal through an antenna (e.g., the antenna 440 in FIG. 4) in a first state in which a first path (e.g., the first path 503 in FIG. 5) electrically connected to a first ground (e.g., the first ground 501 in FIG. 5) and the antenna 440 are connected.

In a first state in which the antenna 440 is electrically connected to the first path 503, the electronic device 101 may output (or radiate) a signal through the antenna 440. The signal output (or radiated) through the antenna 440 may be transmitted to a cellular network (e.g., the first cellular network 292 in FIG. 2 or the second cellular network 294 in FIG. 2) and may be used for performing various services.

In operation 720, in case that at least one component is activated, the electronic device 101 may convert a state from the first state to a second state in which a second path (e.g., the second path 507 in FIG. 5) electrically connected to a second ground (e.g., the second ground 505 in FIG. 5) is connected to the antenna 440.

In case that at least one component of the electronic device 101 is activated, the electronic device 101 may perform a series of operations for reducing (or preventing) a malfunction of the at least one component.

The at least one component may correspond to a component adjacent to the antenna 440. According to an embodiment, the at least one component may include a camera (e.g., the camera 303 in FIG. 3A) adjacent to the antenna 440. According to an embodiment, the at least one component may include another antenna adjacent to the antenna 440. According to an embodiment, the at least one component may include a sensor (e.g., a proximity sensor) adjacent to the antenna 440.

The series of operations of reducing (or preventing) a malfunction of the at least one component may include an operation of reducing a density of a current existing around the at least one component.

In case that at least one component of the electronic device 101 is activated, the electronic device 101 may receive, from an application processor (e.g., the processor 120 in FIG. 1), information indicating that the at least one component is activated, so as to detect that the at least one component of the electronic device 101 is activated. Alternatively, in case that at least one component is activated, the electronic device 101 may receive, from at least one component, information indicating that the at least one component is activated, so as to detect that the at least one component of the electronic device 101 is activated.

When at least one component of the electronic device 101 is activated, the electronic device 101 may control the switch 433 to change a state of the switch 433.

When at least one component of the electronic device 101 is not activated, the electronic device 101 may maintain a state of the switch 433.

In case that at least one component of the electronic device 101 is not activated and the switch 433 is in a first state, the electronic device 101 may maintain the state of the switch 433 in the first state. In case that at least one component of the electronic device 101 is not activated and the switch 433 is in a second state, the electronic device 101 may maintain the state of the switch 433 in the second state.

According to an embodiment, when at least one component of the electronic device 101 is activated, the electronic device 101 may control the switch 433 so that the switch 433 is converted from the first state to the second state (or converted from the second state to the first state). The first state may include a state in which the antenna 440 is electrically connected to the first path 503, and the second state may include a state in which the antenna 440 is electrically connected to the second path 507.

The conversion of the switch 433 from the first state to the second state may refer to a change of a ground electrically connected to the antenna 440 from the first ground 501 to the second ground 505. As the ground electrically connected to the antenna 440 is changed at predetermined times, a current generated by a portion of a signal radiated by the antenna 440 may be dispersed.

The first ground 501 may be electrically spaced apart from the second ground 505, and one layer of the printed circuit board 305 on which the first ground 501 is disposed may be different from one layer of the printed circuit board 305 on which the second ground 505 is disposed. In order to increase a degree of dispersion of the current generated by a portion of the signal radiated by the antenna 440, one layer of the printed circuit board 305 on which the first ground 501 is disposed may be the layer furthest from another layer of the printed circuit board 305 on which the second ground 505 is disposed. According to an embodiment, assuming that the printed circuit board 305 is realized to have 10 layers and the first ground 501 is realized on a first layer of the 10 layers, the second ground 505 may be realized on a tenth layer corresponding to the farthest from the first layer among the 10 layers. The second ground 505 may correspond to a ground not electrically connected to another antenna so as to reduce (or prevent) interference between antennas.

In operation 730, the electronic device 101 may convert the second state to the first state when a predetermined time has elapsed.

The electronic device 101 may control the switch 433 to change the state of the switch 433 at predetermined times (e.g., about 100 ms). According to an embodiment, when a designated time has been elapsed after the switch 433 is converted from the first state to the second state, the electronic device 101 may control the switch 433 so that the switch 433 is converted from the second state to the first state. The above-described operation may be repeatedly performed until the at least one component of the electronic device 101 is deactivated.

According to an embodiment, the density of the current existing around the at least one component of the electronic device 101 when the ground electrically connected to the antenna 440 is changed at predetermined times may be lower compared to that of the current existing around the at least one component of the electronic device 101 when the ground electrically connected to the antenna 440 is not changed.

The decrease in density of the current existing around the at least one component of the electronic device 101 may reduce (or prevent) a malfunction of the at least one component of the electronic device 101.

As described above, the electronic device 101 may reduce (or prevent) a malfunction of at least one component by changing the ground electrically connected to the antenna 440 at predetermined times when the at least one component disposed around the antenna 440 is activated.

An electronic device (e.g., the electronic device 101 in FIG. 4) according to an example embodiment may include an antenna (e.g., the antenna 440 in FIG. 4). The electronic device may include at least one electronic component (e.g., the camera 303 in FIG. 3A). The electronic device may include a switch (e.g., the switch 433 in FIG. 4) configured to electrically connect the antenna and one of a first path connected to a first ground (e.g., the first ground 501 in FIG. 5) disposed on one layer of multiple layers of a printed circuit board and a second path connected to a second ground (e.g., the second ground 505 in FIG. 5) disposed on another layer of the multiple layers. The electronic device may include at least one communication processor, comprising processing circuitry, (e.g., the communication processor 410 in FIG. 4) electrically connected to the switch. At least one communication processor, individually and/or collectively, may be configured to: output a signal through the antenna in a first state in which the antenna is electrically connected to the first path; control, based on the at least one component (e.g., the camera 303 in FIG. 3A) being activated, the switch so that the switch is converted from the first state to a second state in which the antenna is electrically connected to the second path; based on a specified time elapsing, control the switch so that the switch is converted from the second state to the first state.

In the electronic device according to an example embodiment, the at least one electronic component (e.g., the camera 303 in FIG. 3A) may include a component disposed adjacent to the antenna.

In the electronic device according to an example embodiment, the first ground may be electrically spaced apart from the second ground.

In the electronic device according to an example embodiment, said another layer may be a layer furthest from the one layer among the multiple layers.

In the electronic device according to an example embodiment, the at least one electronic component (e.g., the camera 303 in FIG. 3A) may include a camera.

In the electronic device according to an example embodiment, based on the at least one electronic component (e.g., the camera 303 in FIG. 3A) not being activated, at least one communication processor, individually and/or collectively, may be configured to maintain the switch in the first state.

In the electronic device according to an example embodiment, the second ground may correspond to a ground not electrically connected to another antenna.

In the electronic device according to an example embodiment, the specified time may be about 100 ms.

A method of operating an electronic device according to an example embodiment may include: outputting a signal through an antenna in a first state in which the antenna is electrically connected to a first path connected to a first ground disposed on one layer of multiple layers of a printed circuit board; controlling a switch based on at least one electronic component (e.g., the camera 303 in FIG. 3A) being activated, so that the switch is converted from the first state to a second state in which the antenna and a second path connected to a second ground disposed on another layer of the multiple layers are electrically connected; and controlling the switch based on a specified time elapsing so that the switch is converted from the second state to the first state.

In the method of operating the electronic device according to an example embodiment, the at least one electronic component (e.g., the camera 303 in FIG. 3A) may include a component disposed adjacent to the antenna 440.

In the method of operating the electronic device according to an example embodiment, the first ground may be electrically spaced apart from the second ground.

In the method of operating the electronic device according to an example embodiment, said another layer may be a layer furthest from the one layer among the multiple layers.

In the method of operating the electronic device according to an example embodiment, the at least one electronic component (e.g., the camera 303 in FIG. 3A) may include a camera.

The method of operating the electronic device according to an example embodiment may further include maintaining the switch in the first state based on the at least one electronic component (e.g., the camera 303 in FIG. 3A) not being activated.

In the method of operating the electronic device according to an example embodiment, the predetermined time may be about 100 ms.

A communication circuit (e.g., the communication circuit 430 in FIG. 4) according to an example embodiment may include: a switch configured to electrically connect an antenna and one of a first path (e.g., the first path 503 in FIG. 5) connected to a first ground disposed on one layer of multiple layers of a printed circuit board and a second path (e.g., the second path 507 in FIG. 5) connected to a second ground disposed on another layer of the multiple layers; based on at least one electronic component (e.g., the camera 303 in FIG. 3A) of the electronic device being activated, the switch may be converted from a first state in which an antenna is electrically connected to the first path to a second state in which the antenna is electrically connected to the second path; wherein the switch may be configured to be converted from the second state to the first state based on a specified time elapsing.

In the communication circuit according to an example embodiment, based on the at least one electronic component (e.g., the camera 303 in FIG. 3A) not being activated, the switch may be configured to maintain the switch in the first state.

In the communication circuit according to an example embodiment, the at least one electronic component (e.g., the camera 303 in FIG. 3A) may include a component disposed adjacent to the antenna.

In the communication circuit according to an example embodiment, the specified time may be about 100 ms.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
an antenna;
at least one electronic component;
a switch configured to electrically connect the antenna and at least one of a first path connected to a first ground disposed on one layer of multiple layers of a printed circuit board and a second path connected to a second ground disposed on another layer of the multiple layers;
at least one communication processor, comprising processing circuitry, electrically connected to the switch, wherein at least one communication processor, individually and/or collectively, is configured to:
output a signal through the antenna in a first state in which the antenna is electrically connected to the first path;
based on the at least one component being activated, control the switch so that the switch is converted from the first state to a second state in which the antenna is electrically connected to the second path; and
based on a specified time elapsing, control the switch so that the switch is converted from the second state to the first state.

2. The electronic device of claim 1, wherein the at least one electronic component comprises a component disposed adjacent to the antenna.

3. The electronic device of claim 1, wherein the first ground is electrically spaced apart from the second ground.

4. The electronic device of claim 1, wherein said another layer is a layer furthest from the one layer among the multiple layers.

5. The electronic device of claim 1, wherein the at least one electronic component comprises a camera.

6. The electronic device of claim 1, wherein at least one communication processor, individually and/or collectively, is configured to, based on the at least one electronic component not being activated, maintain the switch in the first state.

7. The electronic device of claim 1, wherein the second ground corresponds to a ground not electrically connected to another antenna.

8. The electronic device of claim 1, wherein the specified time is in a range of about 100 ms.

9. A method of operating an electronic device, the method comprising:
outputting a signal through an antenna in a first state in which the antenna is electrically connected to a first path connected to a first ground disposed on one layer of multiple layers of a printed circuit board;
based on at least one electronic component being activated, controlling a switch so that the switch is converted from the first state to a second state in which the antenna and a second path connected to a second ground disposed on another layer of the multiple layers are electrically connected; and
based on a specified time elapsing, controlling the switch so that the switch is converted from the second state to the first state.

10. The method of claim 9, wherein the at least one electronic component comprises a component disposed adjacent to the antenna.

11. The method of claim 9, wherein the first ground is electrically spaced apart from the second ground.

12. The method of claim 9, wherein said another layer is a layer furthest from the one layer among the multiple layers.

13. The method of claim 9, wherein the at least one electronic component comprises a camera.

14. The method of claim 9, further comprising, based on the at least one component not being activated, maintaining the switch in the first state.

15. The method of claim 9, wherein the specified time is in a range of about 100 ms.

16. A communication circuit comprising: a switch configured to electrically connect the antenna and at least one of a first path connected to a first ground disposed on one layer of multiple layers of a printed circuit board and a second path connected to a second ground disposed on another layer of the multiple layers,
wherein the switch is configured to be:
converted from a first state in which an antenna is electrically connected to the first path to a second state in which the antenna is electrically connected to the second path based on at least one electronic component of the electronic device being activated; and converted from the second state to the first state based on a specified time elapsing.

17. The communication circuit of claim 16, wherein the switch is configured to, based on the at least one electronic component not being activated, maintain the switch in the first state.

18. The communication circuit of claim 16, wherein the at least one electronic component comprises a component disposed adjacent to the antenna.

19. The communication circuit of claim 16, wherein the specified time is in a range of about 100 ms.

\* \* \* \* \*